United States Patent
Ueta

(10) Patent No.: US 9,819,831 B2
(45) Date of Patent: *Nov. 14, 2017

(54) IMAGE FORMING APPARATUS AND NOTIFICATION METHOD FOR IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Tsutomu Ueta, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,853

(22) Filed: Nov. 10, 2016

(65) Prior Publication Data

US 2017/0064144 A1 Mar. 2, 2017

Related U.S. Application Data

(63) Continuation of application No. 14/723,713, filed on May 28, 2015, now Pat. No. 9,525,790.

(51) Int. Cl.
*G06F 15/00* (2006.01)
*G06F 1/00* (2006.01)
(Continued)

(52) U.S. Cl.
CPC ........... *H04N 1/442* (2013.01); *G06F 3/1207* (2013.01); *G06F 3/1267* (2013.01); *G06F 3/1285* (2013.01); *H04N 1/0049* (2013.01); *H04N 1/00352* (2013.01); *H04N 1/00488* (2013.01); *H04N 1/32117* (2013.01); *G06F 3/1274* (2013.01); *H04N 2201/0094* (2013.01); *H04N 2201/3212* (2013.01)

(58) Field of Classification Search
CPC ............... H04N 1/442; H04N 1/00352; H04N 1/00488; H04N 1/0049; H04N 1/32117; H04N 1/1274; G06F 3/1207; G06F 3/1267; G06F 3/1285; G06F 3/1274
USPC ............................. 358/1.14, 1.15, 1.1, 1.13
See application file for complete search history.

(56) References Cited

U.S. PATENT DOCUMENTS 8,149,441 B2 4/2012 Bouchard et al.
8,760,681 B2 6/2014 Kato
(Continued)

FOREIGN PATENT DOCUMENTS

JP 2004-362180 12/2004
JP 2008-012773 1/2008

*Primary Examiner* — Douglas Tran
(74) *Attorney, Agent, or Firm* — Amin, Turocy & Watson LLP

(57) ABSTRACT

Certain embodiments provide an image forming apparatus, including: a detector that detects a user who is positioned within a certain range from the apparatus; a verification unit that identifies the detected user by verification; a determination unit that determines whether there is print data which is not output yet on the basis of user identifiable information which is identified by the verification unit; and a notification unit that notifies the user that the print data is not printed yet on the basis of a result which indicates the presence of the print data from the determination unit.

18 Claims, 12 Drawing Sheets

(51) Int. Cl.
*G06K 15/00* (2006.01)
*H04N 1/44* (2006.01)
*H04N 1/00* (2006.01)
*H04N 1/32* (2006.01)
*G06F 3/12* (2006.01)

(56) References Cited

U.S. PATENT DOCUMENTS

2008/0010079 A1  1/2008  Genda
2008/0124093 A1* 5/2008  Kai .................. G03G 15/5087
                                              399/9

* cited by examiner

| JOB NUMBER | JOB TYPE | JOB GENERATION DATE AND TIME | JOB END DATE AND TIME | NUMBER OF PRINTS | USER ID |
|---|---|---|---|---|---|
| ... | ... | ... | ... | ... | ... |
| 1 | PRINT JOB | Feb.1.2015/10:00 | Feb.1.2015/10:02 | 10 | 3 |
| 2 | PRINT JOB | Feb.3.2015/14:00 | Feb.3.2015/14:01 | 7 | 1 |
| 3 | SCAN JOB | Feb.10.2015/15:00 | Feb.10.2015/15:20 | - | 5 |
| 4 | COPY JOB | Feb.11.2015/16:00 | Feb.11.2015/16:05 | 23 | 6 |
| 5 | PRINT JOB | Feb.25.2015/09:00 | YET NOT PRINTED | 1 | 10 |
| 6 | SCAN JOB | Feb.25.2015/12:00 | Feb.25.2015/12:01 | 3 | 15 |
| 7 | PRINT JOB | Feb.25.2015/13:00 | YET NOT PRINTED | 1 | 9 |
| 8 | PRINT JOB | Feb.25.2015/14:00 | Feb.25.2015/14:01 | 1 | 12 |
| ... | ... | ... | ... | ... | ... |

FIG. 9
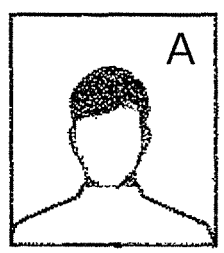 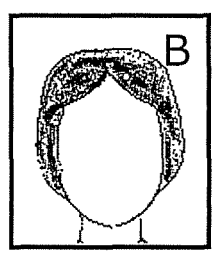 
\*m  \*m+1  \*m+2
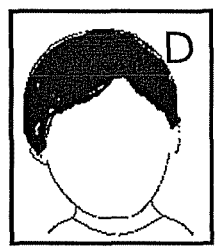
\*m+3

IMAGE FORMING APPARATUS AND NOTIFICATION METHOD FOR IMAGE FORMING APPARATUS

CROSS-REFERENCE TO RELATED APPLICATIONS

This application is a Continuation of application Ser. No. 14/723,713 filed on May 28, 2015, the entire contents of which are incorporated herein by reference.

FIELD

Embodiments described herein relate generally to an image forming apparatus and a notification method for the image forming apparatus.

BACKGROUND

In the related art, there is known a multifunctional peripheral (MFP) that deletes image data that a user forgets to output as time passes from the point in time of storage of the image data.

There is also known a printing apparatus that outputs a printed matter according to an output operation performed by a user on a panel of the printing apparatus after storing print data received from a user terminal.

The printing apparatus does not print the print data immediately after receiving the print data but temporarily stores the print data according to a setting from the user terminal.

Preventing saturation of the storage capacity is required for the printing apparatus. The printing apparatus deletes print data files that are not output for a preset period. Alternatively, the printing apparatus prompts a user to print the print data by display on the operation panel.

However, the print data may be previously deleted when the user wants to output the printed matter. In addition, the user may not pay attention to the display even if the image forming apparatus outputs the display that prompts the user to print the print data.

DESCRIPTION OF THE DRAWINGS

FIG. 3 is a diagram illustrating an example of a job management table that is used in the image forming apparatus;

FIG. 9 is a diagram illustrating a specific example of verification data by the verification unit;

DETAILED DESCRIPTION

Certain embodiments provide an image forming apparatus, including: a detector that detects a user who is positioned within a certain range from the apparatus; a verification unit that identifies the detected user by verification; a determination unit that determines whether there is print data which is not output yet on the basis of user identifiable information which is identified by the verification unit; and a notification unit that notifies the user that the print data is not printed yet on the basis of a result which indicates the presence of the print data from the determination unit.

Hereinafter, a detailed description will be provided for an image forming apparatus and a, display method for the image forming apparatus according to an embodiment with the appended drawings as an example. The same components in each drawing are given the same reference sign, and a duplicate description thereof is omitted.

Figure 1:
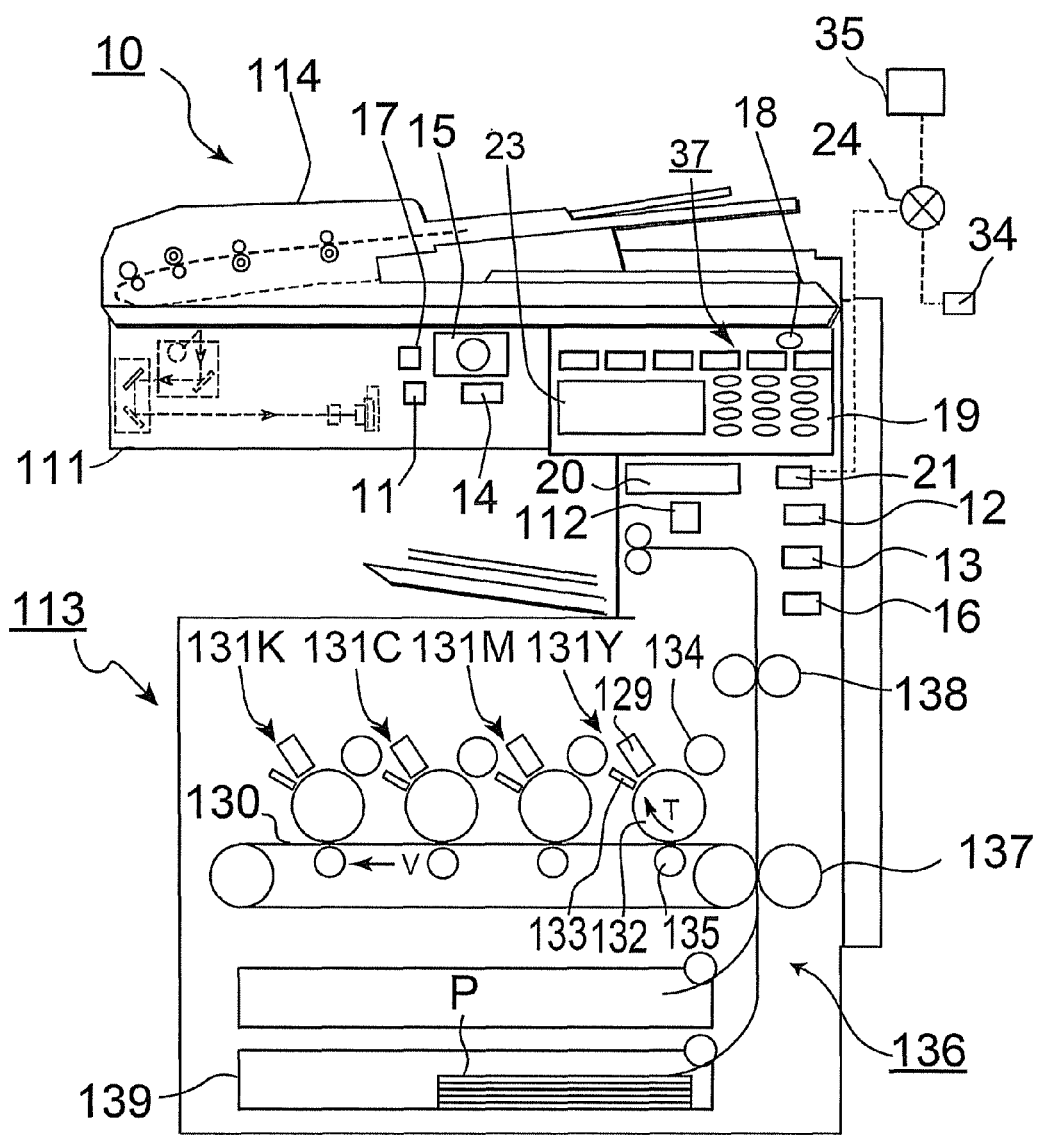
FIG. 1 is a configuration diagram of an image forming apparatus according to an embodiment.

FIG. 1 is a configuration diagram of the image forming apparatus according to the embodiment.

An MFP 10 is provided with a detector 11, a verification unit 12, a determination unit 13, and a notification unit 14.

The MFP 10 is provided with a camera 15, a storage unit 16, a distance sensor 17 (sensor), and a speaker 18.

The detector 11 detects a user who is positioned within a certain range from the MFP 10.

The verification unit 12 identifies the user detected by the detector 11 by verification.

The determination unit 13 determines whether there is print data that is not output yet by a user identification (ID) identified by the verification unit 12. The user ID is user identifiable information.

The notification unit 14 notifies the user that print data is not printed yet on the basis of a determination result indicating the presence of print data from the determination, unit 13.

The detector 11 is, for example, an infrared sensor that has a pyroelectric device. The detector 11 detects a person within a predetermined distance from the MFP 10.

The detector 11 horizontally faces the front space when viewed from the MFP 10. Alternatively, the detector 11 faces the floor in front of the MFP 10. The detector 11 has a three-dimensional detection range.

The verification unit 12 verifies an individual person with the camera 15 by facial verification.

The verification unit 12 extracts facial feature data from image data obtained from the camera 15.

The verification unit 12 outputs a user ID by facial verification that is based on the image captured from the camera 15 and a facial image stored on the storage unit 16.

The determination unit 13 determines input and output of files by job management.

The function of the determination unit 13 is performed by an operating system (OS) that has a job management table and a central processing unit (CPU) program that accesses a job registration memory.

The notification unit 14 notifies the user of a message that indicates the presence of print data at the timing of detection of the user by the detector 11.

The notification by the notification unit 14 may be performed by outputting audio from the speaker 18.

The notification unit 14 may have a light-emitting diode (LED).

The distance sensor 17 outputs distance information between the user and the MFP 10. The notification unit 14, after audio is output, changes the level of the audio or the output interval of the audio on the basis of the distance information.

The notification unit 14 may change both the level of the audio and the output interval of the audio on the basis of the distance information.

The notification unit 14 may transmit the notification to a PC 35 (user terminal) via mail.

The camera 15 uses, for example, a complementary MOS (CMOS) image sensor.

The MFP 10 is also provided with an operation panel 19, a controller 20, and a network interface 21.

The operation panel 19 includes an input device 37 such as a button and a key. The operation panel 19 includes a window 23 and the speaker 18.

The controller 20 is a main controller that manages the entire operation of the MFP 10.

The network interface 21 is a local area network (LAN) card.

The network interface 21 receives a print request from the personal computer (PC) 35 through a network 24.

The MFP 10 is provided with a scanner 111, an image processing unit 112, and a printing unit 113.

The scanner 111 scans an original document from an automatic document feeder (ADF) 114.

The image processing unit 112 converts the image data in three colors of R, G, and B into the image data in four print colors of Y, M, C, and K.

The printing unit 113 prints the image with four print colors of C, M, Y, and K.

The printing unit 113 is provided with four light exposers 129, image forming units 131C, 131M, 131Y, and 131K, and a belt 130.

The light exposer 129 modulates laser light from each color semiconductor laser according to an image signal. The belt 130 endlessly travels in a counterclockwise direction V.

The yellow image forming unit 131Y is provided with a drum 132, a charger 133, a developer 134, and a transfer unit 135.

The drum 132 is a photoconductive drum that rotates in a clockwise direction T.

The charger 133 charges the surface of the drum 132.

The developer 134 develops an electrostatic latent image on the drum 132 with toner.

The transfer unit 135 primarily transfers the toner image on the drum 132 onto the belt 130.

Configurations of the magenta image forming unit 131M, the cyan image forming unit 131C, and the black image forming unit 131K are substantially the same as the configuration of the image forming unit 131Y.

The printing unit 113 further includes a sheet conveyor 136, a secondary transfer unit 137, and a fixer 138.

The sheet conveyor 136 guides a sheet P from a tray 139 to the printing unit 113.

The secondary transfer unit 137 secondarily transfers the four-colored toner image formed by the image forming units 131C, 131M, 131Y, and 131K onto the sheet P.

The fixer 138 fixes a toner image that is not fixed yet onto the sheet P.

Figure 2:
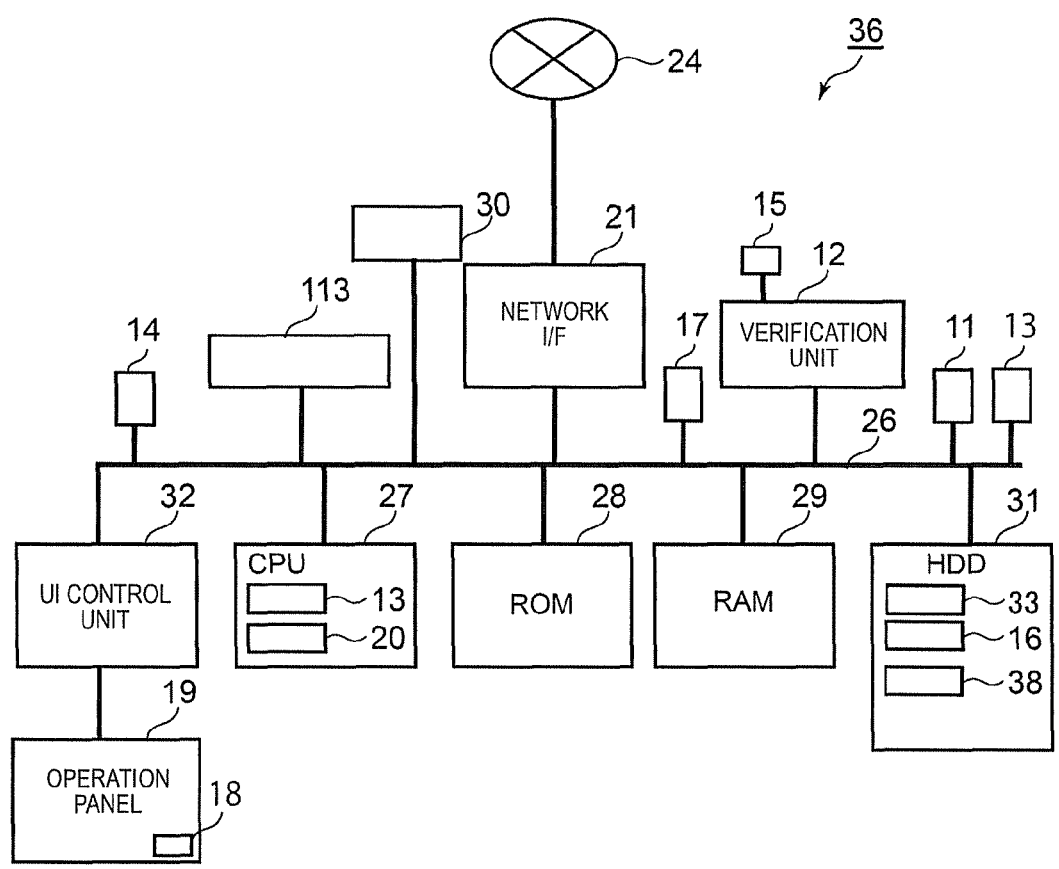
FIG. 2 is a functional block diagram of the image forming apparatus.

FIG. 2 is a functional block diagram of the image forming apparatus according to the embodiment. FIG. 2 mainly illustrates a control system 36. The previously described reference sign represents the corresponding element.

The MFP 10 is provided with the control system 36.

The detection range of the detector 11 depends on the capability of the pyroelectric device to detect a heat source.

The verification unit 12 obtains the image of a person who approaches the MFP 10. The MFP 10 is capable of performing verification without the user operating facial verification and the like consciously.

The notification is transmitted to the user via mail through the network interface (I/F) 21. The speaker 18 may output audio.

The verification unit 12 is provided with, for example, a unit that compares the facial image and the captured data including the facial part of the user within the range of the camera 15.

The verification unit 12 may identify the user from one or more of specific users by referring to a user information list that is stored on the storage unit 16.

The specific user indicates, for example, a specific person in a certain department or on a certain floor among all employees.

The MFP 10 includes a job management table 33 used by the determination unit 13 on a storage 31. Alternatively, the storage unit 16 or a RAM 29 may store the job management table 33.

The camera 15 obtains an image that includes the user who is positioned in the vicinity of the MFP 10. The camera 15 has wide vision (angle of view) in the vicinity of the MFP 10.

The vicinity of the MFP 10 means a space having a range in which the success rate of verification performed by the verification unit 12 is greater than a desired threshold.

The control system 36 includes the storage 31 and a user interface control unit (UI control unit) 32.

A hard disk drive (HDD) is used in the storage 31. The storage 31 constitutes the storage unit 16.

The storage 31 (or the storage unit 16 or the RAM 29) may store the job management table 33.

A user information list 38 stores a user ID associated with print data that is not output yet.

The storage 31 stores the OS that a CPU 27 executes.

The user interface control unit 32 controls a user interface that is related to the notification unit 14, the speaker 18, and the operation panel 19.

The control performed by the user interface control unit 32 targets, for example, message display performed by the notification unit 14; switching of display of the window 23; reception of input from the input device 37; and amplification of the audio signal transmitted to the speaker 18.

The control system 36 also includes the CPU 27, a read-only memory (ROM) 28, the random access memory (RAM) 29, and a page memory 30 on a bus 26.

The CPU 27 performs the function of the determination unit 13 and the controller 20.

The ROM 28 stores an application program that the CPU 27 executes.

The RAM 29 transmits and receives data between the OS and the CPU program.

The page memory 30 stores image data that is sent from the scanner 111 to the printing unit 113.

A notification method for the image forming apparatus according to the present embodiment is a method of notifying the user that a print file that is not output yet remains in the MFP 10.

The method of notifying the user uses the detector 11 to detect the user who is positioned within a certain range from the MFP 10.

The method uses the verification unit 12 to identify the user by verification.

The method uses the determination unit 13 to determine whether there is print data that is not output yet on the basis of the user information obtained by identification.

The method uses the notification unit 14 to notify the user of the result that indicates the presence of print data.

The notification is triggered by the detection of the presence of the user within the range.

The notification is performed by displaying a message or outputting audio. The notification may be performed by mail transmission to the PC 35.

The method, before the detection of the user, generates the user information list 38 on which print data that is not output yet is associated with a user ID.

In the identification of the user, the method identifies the user from one or more of specific users by referring to the user information list.

In the notification, the method may change the level of the audio and the output interval of the audio on the basis of the distance information between the user and the MFP 10.

Next, the operation of the MFP 10 having the above configuration will be described.

The MFP 10 is introduced in a certain department or on a certain floor.

A server 34 stores the user ID of multiple users belonging to the department.

For example, the server 34 may collect the user ID when each user logs on the server 34 from the PC 35.

The controller 20 obtains the user ID from the server 34 after the MFP 10 is started. The OS registers a job in the job management table 33.

FIG. 3 is a diagram illustrating an example of the job management table 33. The previously described reference sign represents the corresponding element.

The OS stores a job type associated with a user ID in order of occurrence of a job.

The job management table 33 indicates the presence of a print job that is not output yet.

The job type indicates, for example, a copy job, a print job, and a scan job.

The copy job is a job in which the printing unit 113 prints data that is scanned by the scanner 111.

The print job is a job in which the printing unit 113 prints print spool data from the PC 35.

The scan job is a job in which the scanned data is transmitted to the remote server 34. The scan job also includes a job in which the scanned data is stored on the storage 31.

Figure 4:
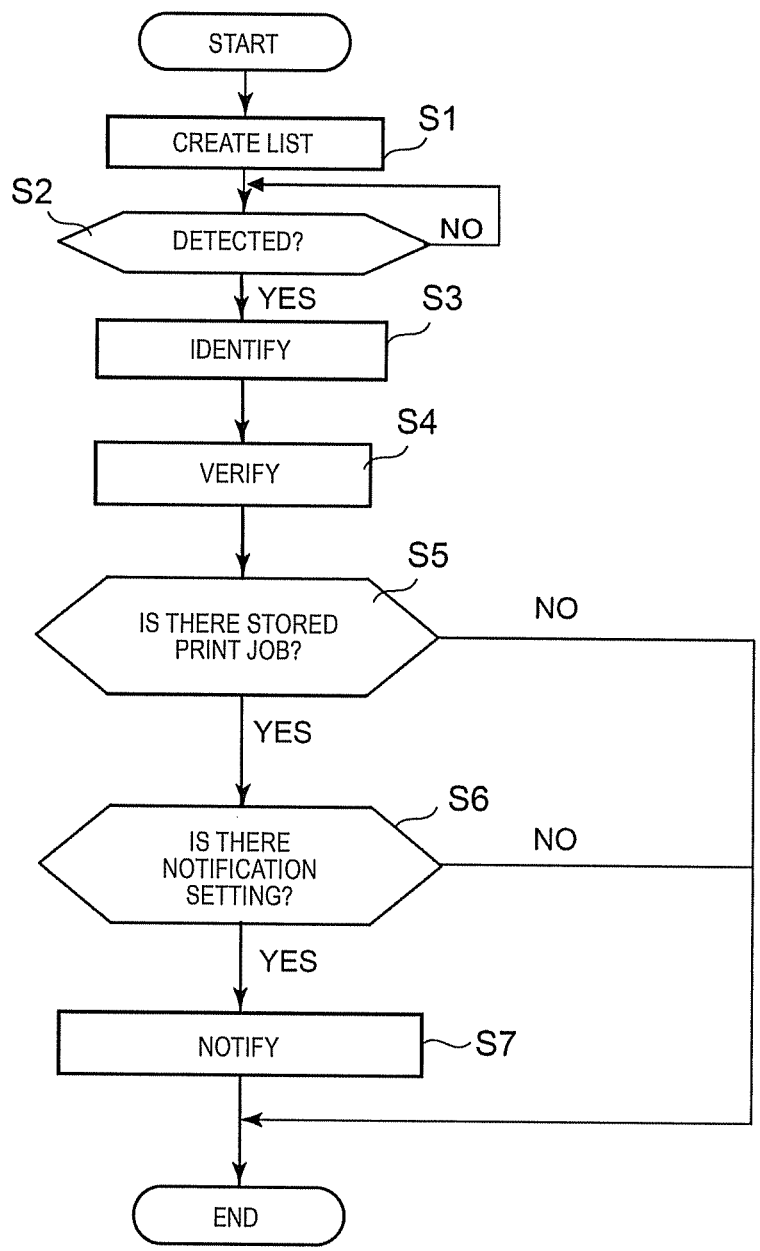
FIG. 4 is a flowchart for describing a notification method for the image forming apparatus.

FIG. 4 is a flowchart for describing the notification method for the MFP 10.

In Act S1, the controller 20, for example, generates the user information list on the basis of the job management table 33.

Figure 5:
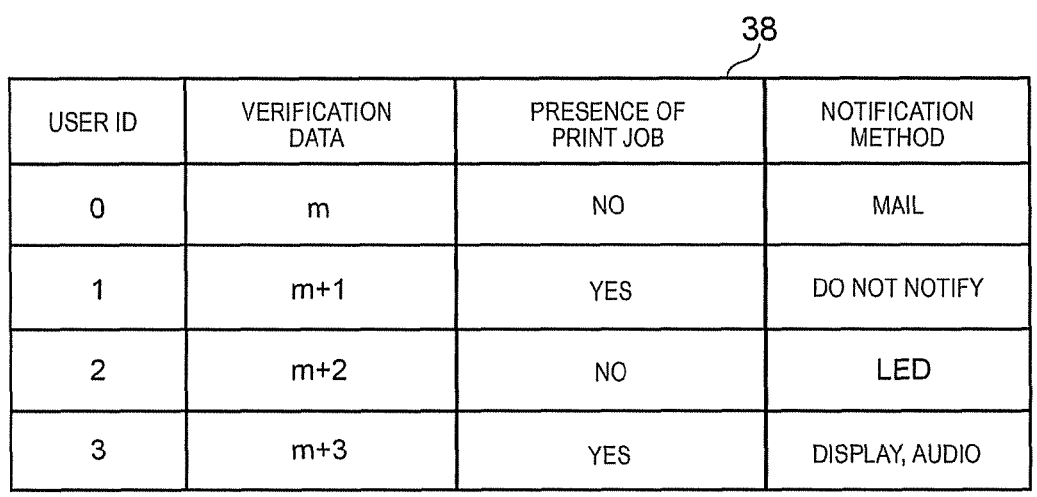
FIG. 5 is a diagram illustrating an example of a list that is stored on a storage unit of the image forming apparatus.

FIG. 5 is a diagram illustrating an example of the user information list 38.

Print data that is not output yet is associated with a user ID on the user information list 38.

"Verification data" is feature data of a user for facial verification. "Verification data" is associated with an address pointer of the storage 31. The storage 31 stores facial image data for each user at the address pointer.

"Notification method" is the type of the notification method that is set in advance by a user. "Notification method" is registered according to a setting made on the server 34 by, for example, the PC 35 or the operation panel 19.

"LED" represents a notification method in which the user interface control unit 32 causes the LED to blink.

In Act S2 in FIG. 4, the detector 11 continues to detect a user (route NO).

When the detector 11 passes through the route YES according to detection of a user in Act S2, the verification unit 12 identifies the user in Act S3.

Figure 6:
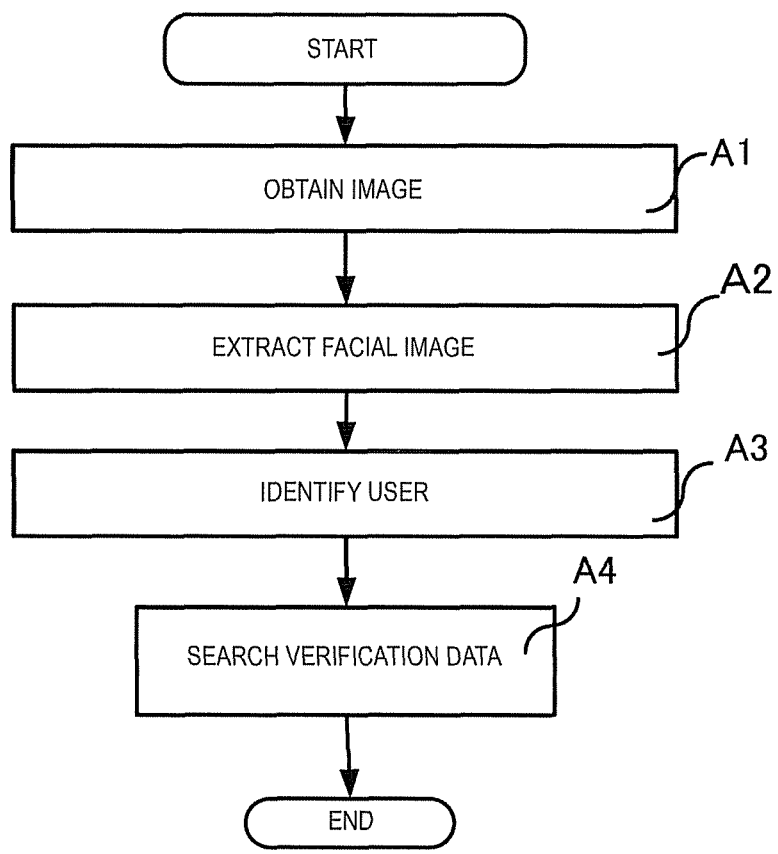
FIG. 6 is a flowchart illustrating a specific example of identification performed by a verification unit.

FIG. 6 is a flowchart illustrating a specific example of identification performed by the verification unit 12.

In ACT A1, the verification unit 12 obtains an image.

Figure 7:
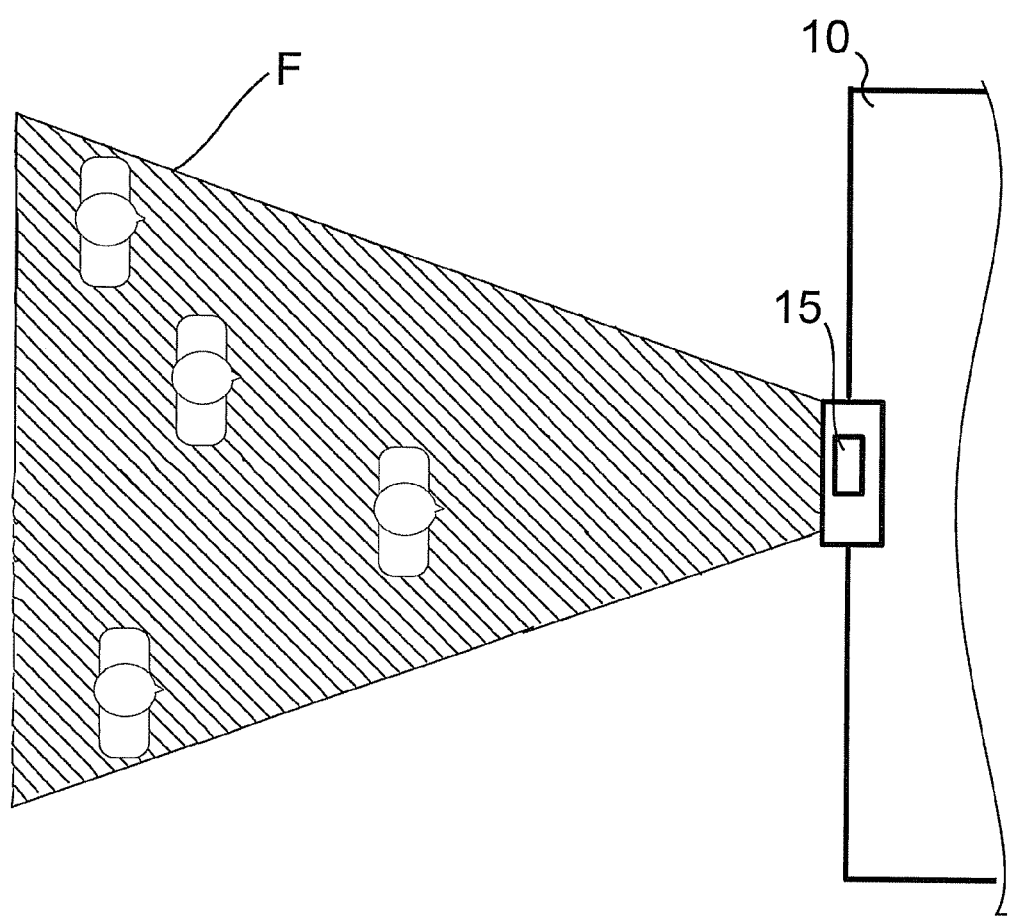
FIG. 7 is a plan view illustrating the field of vision of a camera that is used in the verification unit.

FIG. 7 is a plan view illustrating the field of vision of the camera 15. The previously described reference sign represents the corresponding element.

A field of vision F of the camera 15 is a three-dimensional range. A user who is positioned in the vicinity of the MFP 10 is included in the range. The camera 15 outputs a plane image area from the three-dimensional field of vision F. The camera 15 captures the image area as a stationary image or a moving image.

The controller 20 or the verification unit 12 obtains the image of the vicinity of the MFP 10 from the camera 15.

In Act A2 in FIG. 6, the verification unit 12 extracts a facial image.

In Act A2, the verification unit 12 detects a moving object area in the image area. The verification unit 12 trims a part that is equivalent to the size of the head of a person from the size of the object in the changing area.

In Act A3, the verification unit 12 identifies a user.

In Act A4, the verification unit 12 checks the presence or absence of the verification data.

In Act S4 in FIG. 4, the verification unit 12 performs facial verification for the user.

For example, the verification unit 12 extracts contours; extracts elements such as eyes, a mouth, a nose, ears, a hairstyle, accessories, and facial color; and digitizes features of the elements.

Figure 8:
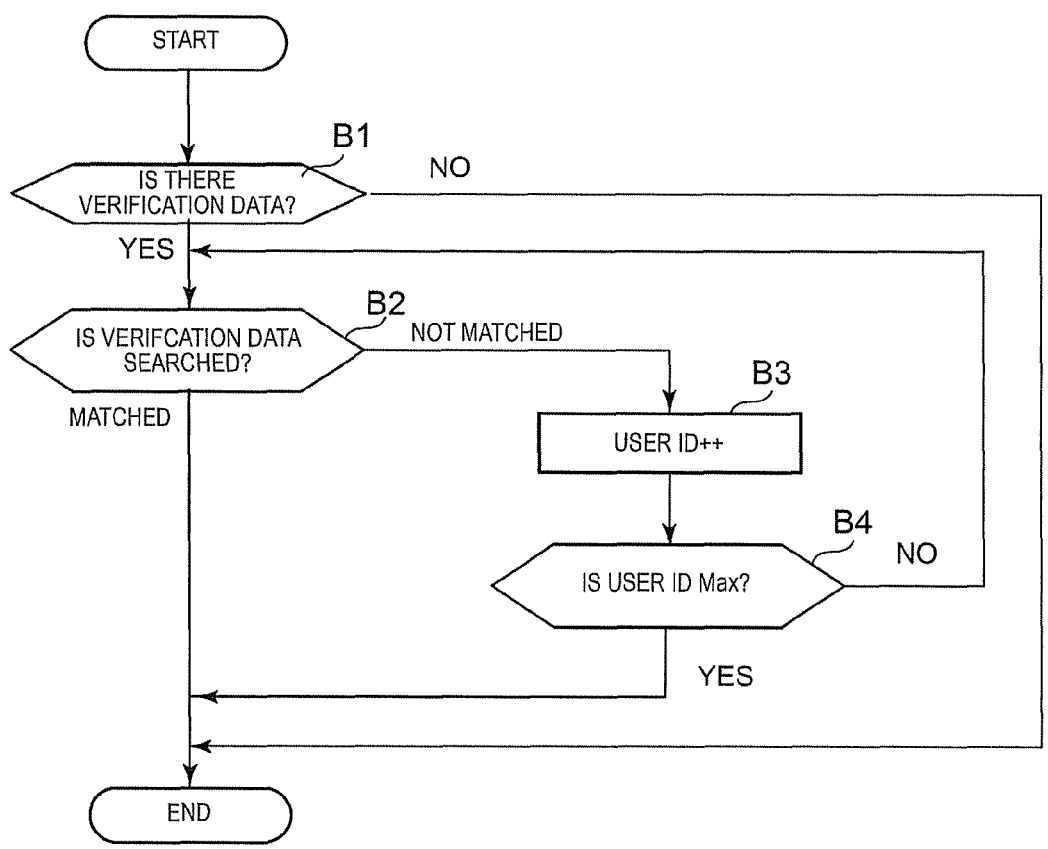
FIG. 8 is a flowchart illustrating a specific example of verification performed by the verification unit.

FIG. 8 is a flowchart illustrating a specific example of verification performed by the verification unit 12.

FIG. 9 is a diagram illustrating a specific example of the verification data. The previously described reference sign represents the corresponding element. FIG. 9 illustrates facial images stored at the address pointers of the storage 31. *m and the like represent the address pointers.

In Act B1 in FIG. 8, the presence of the verification data is determined.

In Act B1, when the verification data exists, the verification unit 12 passes through the route YES. In Act B2, the verification unit 12 searches for the verification data from the user information.

In Act B2, the verification unit 12 determines that the verification data is not matched. The verification unit 12, after passing through the route "not matched", increments the pointer of a user ID to the next user ID in Act 83.

In Act B4, the verification unit 12 determines whether the user ID is a maximum value. The maximum value is, for example, the number of entries on the user information list 38.

When the user ID is less than the maximum value, the verification unit 12 passes through the route NO in Act B4 and returns to the process of Act B2.

In Act B2, when the verification unit 12 determines that the verification data is matched, the verification unit 12 passes through the route "matched" and ends the process.

Alternatively, in Act B4, when the verification unit 12 determines that the user ID exceeds the maximum value, the verification unit 12 ends the process.

The verification unit 12 is assumed to obtain, for example, a user A having a user ID "0", a user B having a user ID "1", a user C having a user ID "2", and a user D having a user ID "3".

In Act S5 in FIG. 4, the verification unit 12 determines the presence or absence of the print job of the user ID.

In Act S5, the verification unit 12 searches the user information list 38.

For example, the user B having the user ID "1" and the user D having the user ID "3" exist on the user information list 38.

In Act S5, the verification unit 12, according to the determination of the presence of the print job, passes through the route YES. In Act S6, the controller 20 determines whether a notification method is set.

Figure 10:
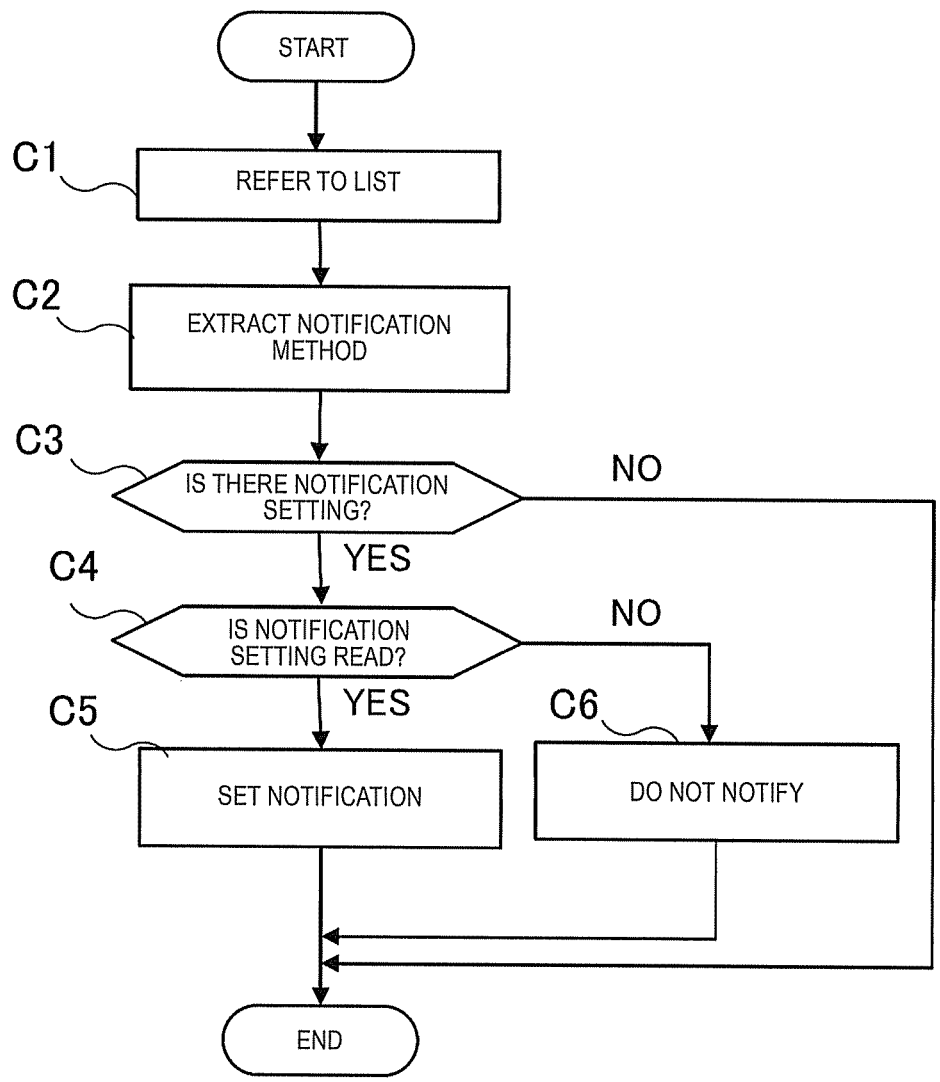
FIG. 10 is a flowchart illustrating an example of a notification method determination performed by a notification unit.

FIG. 10 is a flowchart illustrating an example of a notification method determination.

To describe with the user D who agreed to be notified, the controller 20 refers to the user information list 38 in Act C1.

In Act C2, the controller 20 determines whether notification is set.

When notification is not set in Act C2, the controller 20 passes through the route NO and ends the process.

When the controller 20 determines that notification is set in Act C2, the controller 20 passes through the route YES and reads the content of the notification setting from the user information list 38 in Act C4.

In Act C4, when the controller 20 determines that notification is set, the controller 20 passes through the route YES and ends the process with a return value that indicates the type of the content of notification in Act C5.

In Act S7 in FIG. 4, the controller 20 notifies the notification unit 14 of a message by using the extracted notification method.

Figure 11:
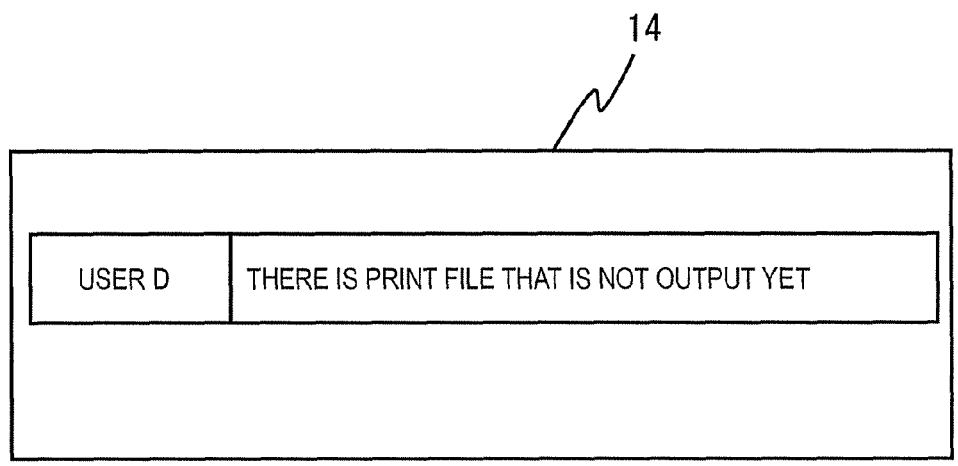
FIG. 11 is a diagram illustrating an example of a message by the notification unit.

FIG. 11 is a diagram illustrating an example of the message by the notification unit 14. The previously described reference sign represents the corresponding element.

When there is a print file that is not output yet, the target user D is notified of the message.

To describe with the user B who does not set notification, the controller 20 extracts the corresponding notification method (Acts C1, C2, and C3), passes through the route NO according to the determination of the setting in which notification is not set, and ends the process.

Even if the controller 20 determines that the notification method is set (route YES in Act C3), the controller 20 passes through the route NO in Act C4 when notification is not set and ends the process in Act C6 with a return value that indicates notification is not set.

The notification unit 14 does not transmit the message to the user B according to the user B who does not set notification. The message can be customized for each user.

In Act S5 in FIG. 4, when the print job does not exist, the controller 20 passes through the route NO and ends the process.

According to the description so far, the controller 20 ends the process.

The notification method can be changed variously.

In Act S6, the controller 20 may notify the PC 35 of the fact that print data is not output yet. Settings on the MFP 10 are performed in advance by the user.

Figure 12:
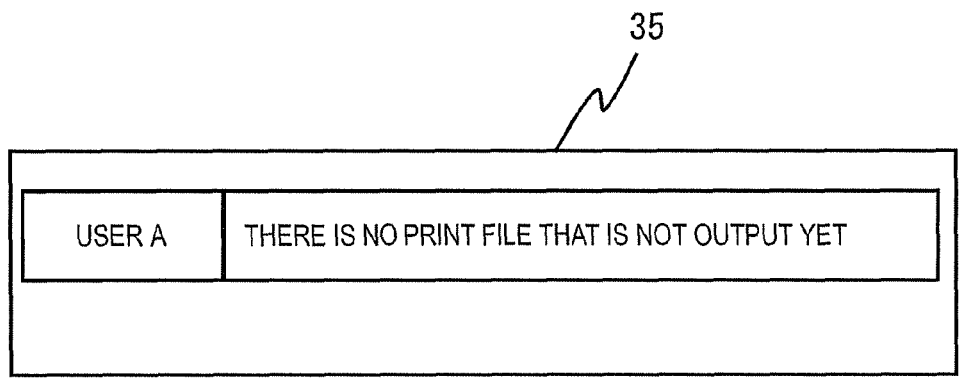
FIG. 12 is a diagram illustrating another example of the message.

FIG. 12 is a diagram illustrating another example of the message by the notification unit 14. The previously described reference sign represents the corresponding element.

The absence of the print job that is not output yet can be checked on the PC 35. Forgetting of printing can be prevented.

The notification unit 14 may change the audio output on the basis of the distance information between the user and the MFP 10.

Figure 13:
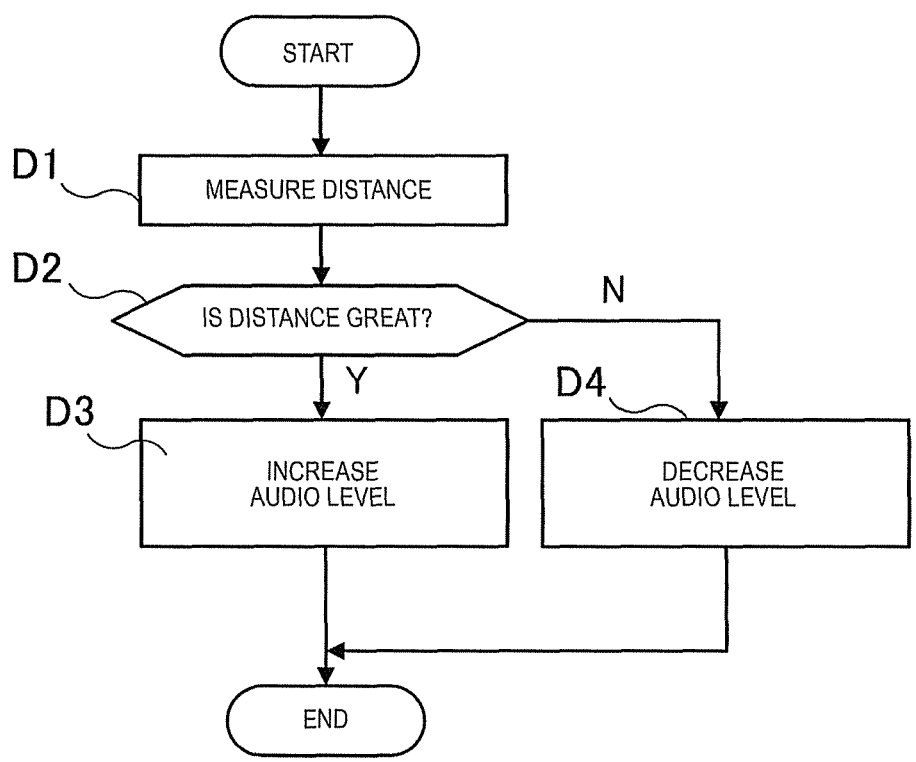
FIG. 13 is a flowchart for describing a method of changing audio output by the notification unit.

FIG. 13 is a flowchart for describing a method of changing the audio output by the notification unit 14.

In Act D1, the distance sensor 17 measures a distance.

The distance means the distance between the user and the MFP 10.

In Act D2, the notification unit 14 determines whether the distance obtained in Act D1 is greater than the distance when the user is identified and verified.

In Act D2, when the notification unit 14 determines that the obtained distance is greater, the notification unit 14 passes through the route YES. In Act D3, the notification unit 14 increases the level of the audio output.

In Act D3, the notification unit 14 may decrease the interval of repeated output of auditory guidance that says "There is a printed matter that is not output yet".

In Act D2, when the notification unit 14 determines that the obtained distance is smaller, the notification unit 14 passes through the route NO. In Act D4, the notification unit 14 decreases the level of the audio output.

In Act D4, the notification unit 14 may increase the interval of repeated output of the auditory guidance.

By having such a configuration, the fact that there is print data that is not output yet is notified to the user according to the setting without requiring the consciousness of the user.

According to the image forming apparatus and the notification method for the image forming apparatus in the embodiment, forgetting of print data output can be prevented.

According to the apparatus and the method, the user does not need to consciously operate the operation panel 19. When the user approaches the vicinity of the MFP 10, audio is output to the user, and mail is notified to the user.

The user in the department and the like can be notified of the presence or absence of print data that is not output yet.

The user having print data can receive notification that prompts the user to output the print data. Forgetting of print data output can be prevented.

The MFP 10 can prevent the saturation of the storage capacity of the storage 31.

The print data being previously deleted when the user wants to output the printed matter can be prevented.

In the above embodiment, an ultrasonic wave transceiver device or a radar transceiver device may be used in the detector 11. The detector 11 may be a personal load sensor that is disposed under the floor in the vicinity of the MFP 10.

The MFP 10 may include the storage unit 16 on the server 34. The verification unit 12 receives the user information list from the storage unit 16 via the network 24.

The camera 15 may be disposed apart from the MFP 10. The MFP 10 may obtain the user who approaches the vicinity of the MFP 10 by receiving the image from the camera 15 that is apart from the MFP 10.

The function of the verification unit 12 is performed by other processors, ROMs, RAMs, LSIs, and the like. The MFP 10 may perform personal verification through a wireless medium such as radio frequency identification (RFID) or a wireless tag.

The MFP 10 may include the notification unit 14 and the speaker 18 separately from the operation panel 19.

The MFP 10 may include the notification unit 14 on the operation panel 19.

In the above embodiment, a capturing unit in which multiple capturing elements such as a charge coupled device (CCD) may be used instead of the camera 15.

A solid state drive (SSD) may be used in the storage 31.

In the above embodiment, the image forming apparatus may be a printing apparatus other than the MFP 10.

In the above embodiment, the MFP 10 may request the user to log on after the MFP 10 is started.

The print data may be accumulated on the storage 31 due to jobs other than the print job, the copy job, and the scan job. The MFP 10 may notify the user that print data that is generated by these jobs is not output yet.

An example of other jobs is a job of transmitting data that is scanned by the scanner 111 via FAX; a FAX reception job in which the printing unit 113 prints image data that is received via FAX; a mail transmission job of mailing files on the storage 31 to an address; or a job of printing files after the files are stored on the storage 31 from a USB memory.

The superiority of the image forming apparatus and the notification method for the image forming apparatus according to the embodiment over a product that is embodied through these modifications is not impaired.

While certain embodiments have been described, these embodiments have been presented by way of example only, and are not intended to limit the scope of the inventions. Indeed, the novel methods and systems described herein may be embodied in a variety of other forms; furthermore various omissions and substitutions and changes in the form of methods and systems described herein may be made without departing from the spirit of the inventions. The accompanying claims and their equivalents are intended to cover such forms or modifications as would fall within the scope and spirits of the inventions.

What is claimed is:

1. An image forming apparatus, comprising:
an image capturing device configured to capture a first image of a user who is positioned within a certain range from the apparatus;
an identification unit that identifies the user based on the first image and a second image stored on a memory;
a determination unit that determines whether presence or absence of print data that is not yet output on the basis of user identifiable information identified by the identification unit; and
a notification unit that notifies the user a determination result indicative of whether presence or absence of the print data from the determination unit.

2. The apparatus of claim 1, further comprising:
a detector that detects the user;
the notification unit notifies the user of the result at a timing of detection of the user by the detector.

3. The apparatus of claim 1, wherein
notification by the notification unit performed by one or more of displaying a message, outputting audio, and transmitting mail to a user terminal.

4. The apparatus of claim 1, further comprising:
a storage unit that stores a user information list on which the print data which is not output yet is associated with the user identifiable information, wherein
the identification unit identifies the user from one or more of specific users by referring to the user information list.

5. The apparatus of claim 1, further comprising:
a sensor that outputs distance information between the user and the apparatus, wherein
the notification unit outputs audio and changes one or more of the level of the audio and the output interval of the audio on the basis of the distance information.

6. A notification method for an image forming apparatus, comprising:
capturing a first image of a user who is positioned within a certain range from the apparatus;
identifying the user based on the first image and a second image stored in a memory in advance;
determining whether presence or absence of print data that is not yet output on the basis of user identifiable information after identification; and
notifying the user a determination result indicative of whether presence or absence of the print data.

7. The method of claim 6 further comprising:
detecting the user before the capturing the first image; wherein
the notifying is triggered by the detecting of the presence of the user within the range.

8. The method of claim 6, wherein
the notifying is performed by one or more of displaying a message, outputting audio, and transmitting mail to a user terminal.

9. The method of claim 6, further comprising:
generating a user information list on which the print data that is not output yet is associated with the user identifiable information before the capturing the first image, wherein
in the identifying of the user, the user is identified from one or more of specific users by referring to the user information list.

10. The method of claim 6, wherein
in the notifying, one or more of the level of the audio and the output interval of the audio are changed on the basis of distance information between the user and the apparatus.

11. The apparatus of claim 3, further comprises a controller configured to control the notification unit wherein
the notification is performed by transmitting the mail and the controller determines whether the notification is required is set for identified user by the identification unit, and transmits the mail to the identified user by determination result indicative of that the notification is required.

12. The apparatus of claim 4, wherein
the storage unit associates further with a notification method for every user identifiable information in the user information list and
the notification unit notifies using the notification method matched for identified user by the identification unit in the user information list.

13. The apparatus of claim 5, wherein
the notification unit compares a first distance from the sensor obtained when the user is identified with a second distance obtained from the sensor after identification of the user, and increases a first level of the audio if the second distance is greater than the first distance and decreases a second level of the audio if the second distance is smaller than the first distance.

14. The apparatus of claim 5, wherein
the notification unit compares a first distance obtained from the sensor when the user is identified with a second distance obtained from the sensor after identification of the user, and increases a first output interval if the second distance is greater than the first distance and decreases a second output interval if the second distance is smaller than the first distance.

15. The method of claim 8, wherein
the notification is performed by transmitting the mail and in the notifying the user,
  determining whether the notification is required is set for identified user; and
  transmitting the mail to the identified user by determination result indicative of that the notification is required.

16. The method of claim 9, wherein
in the generating the user information list before the capturing the first image,
associating further with a notification method for every user identifiable information in the user information list and
in the notifying the user,
notifying using the notification method matched for identified user in the user information list.

17. The method of claim 10, wherein
in the notifying the user,
  comparing a first distance from the sensor obtained when the user is identified with a second distance obtained from the sensor after identification of the user;
  increasing a first level of the audio if the second distance is greater than the first distance; and
  decreasing a second level of the audio if the second distance is smaller than the first distance.

18. The method of claim 10, wherein
in the notifying the user,
  comparing a first distance obtained from the sensor when the user is identified with a second distance obtained from the sensor after identification of the user;
  increasing a first output interval if a second distance is greater than the first distance; and
  decreasing a second output interval if the second distance is smaller than the first distance.

* * * * *